United States Patent [19]
Aoki et al.

[11] Patent Number: 5,576,863
[45] Date of Patent: Nov. 19, 1996

[54] GRAY SCALE MULTI DOMAIN LIQUID CRYSTAL DISPLAY PANEL HAVING CAPACITIVE VOLTAGE DIVISION CHARACTERISTICS

[75] Inventors: Shigeo Aoki; Yasuhiro Ukai, both of Kobe; Tomihisa Sunata, Miki; Takanobu Nakagawa; Minoru Shibazaki, both of Kobe, all of Japan

[73] Assignee: Hosiden Corporation, Osaka, Japan

[21] Appl. No.: 246,302

[22] Filed: May 19, 1994

[30] Foreign Application Priority Data

May 26, 1993 [JP] Japan .................................... 5-124204

[51] Int. Cl.$^6$ ........................ G02F 1/1343; G02F 1/1335; G02F 1/1337
[52] U.S. Cl. ................. 359/76; 359/54; 359/55; 359/73; 359/75
[58] Field of Search ................. 359/54, 55, 73, 359/75, 76, 78

[56] References Cited

U.S. PATENT DOCUMENTS

| | | | |
|---|---|---|---|
| 4,712,877 | 12/1987 | Okada et al. | 359/54 |
| 4,840,460 | 6/1989 | Bernot et al. | 359/76 |
| 5,124,824 | 1/1992 | Kozaki et al. | 359/73 |
| 5,196,953 | 3/1993 | Yeh et al. | 359/73 |
| 5,280,375 | 1/1994 | Tsuda et al. | 359/76 |

FOREIGN PATENT DOCUMENTS

| | | | |
|---|---|---|---|
| 0316708 | 5/1989 | European Pat. Off. . | |
| 0367616 | 5/1990 | European Pat. Off. . | |
| 0549283 | 6/1993 | European Pat. Off. . | |
| 3008499 | 4/1993 | Japan | 359/54 |

OTHER PUBLICATIONS

Y. Koike et al., "*Late-News Paper*: A Full-Color TFT-LCD with a Domain-Divided Twisted-Nematic Structure," *1992 SID International Symposium Digest of Technical Papers*, May 1992, pp. 798–801.

K. Takatori et al., "A Complementary TN LCD with Wide-Viewing-Angle Grayscale," *Japan Display '92*, pp. 591–594 no month.

*Primary Examiner*—Wael Fahmy
*Assistant Examiner*—Fetsum Abraham
*Attorney, Agent, or Firm*—Pollock, Vande Sande & Priddy

[57] ABSTRACT

Liquid crystal is encapsulated between two transparent substrates 16, 17. Pixel electrodes 13 are formed on the inner surface of the transparent substrate 17 in the form of a matrix while a common electrode 12 is formed on the inner surface of the transparent substrate 16. Each pixel electrode 13 is divided into subpixel electrodes $13_1$, $13_2$. The subpixel electrode $13_1$ is connected to the drain of a thin film transistor 21 formed adjacent the subpixel electrode to apply driving voltage to the electrode. The subpixel electrode $13_2$ is supplied with capacitance-divided driving voltage through a capacitor comprising the electrode $13_1$, and a control capacitor 15 connected thereto with an insulation layer 14 interposed therebetween. Each of the subpixel electrodes $13_1$, $13_2$ are divided into two domains on which are formed alignment layers 41a, 41b, 42a, 42b, in opposition to alignment layers 43a, 43b, 44a, 44b formed on the common electrode 12. One of the opposed alignment layers is adapted to impart to the liquid crystal a pretilt angle greater than the other alignment layer. One of a pair of adjacent orientating films in the same plane is adapted to impart to the liquid crystal a pretilt angle greater than the other orientating film.

16 Claims, 10 Drawing Sheets

FIG. 4 PRIOR ART  Normally White H.T.

FIG. 5 PRIOR ART — Normally White M.D.

GRAY SCALE MULTI DOMAIN LIQUID CRYSTAL DISPLAY PANEL HAVING CAPACITIVE VOLTAGE DIVISION CHARACTERISTICS

FIELD OF THE INVENTION

This invention pertains to a gray scale liquid crystal (LC) display panel having pixel electrodes each being divided into a plurality of subpixel electrodes in which the driving voltage applied to each pixel electrode is distributed to the associated subpixel electrodes at ratios different from each other so that the viewing angle of the panel may be widened.

BACKGROUND OF THE INVENTION

Figure 1A:
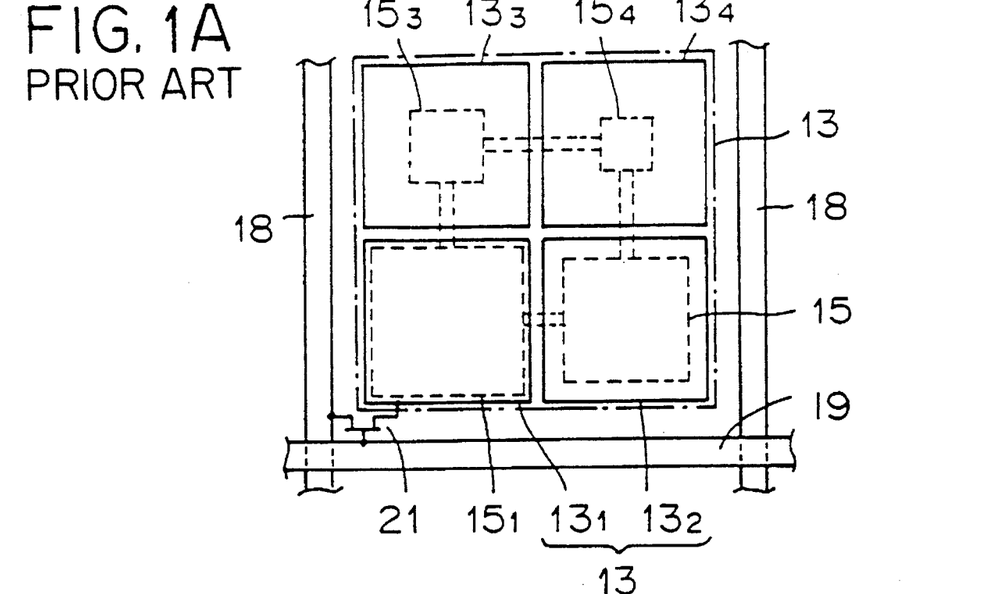
FIG. 1A is a plan view of approximately one pixel region in a conventional gray scale LCD panel.
Figure 1B:
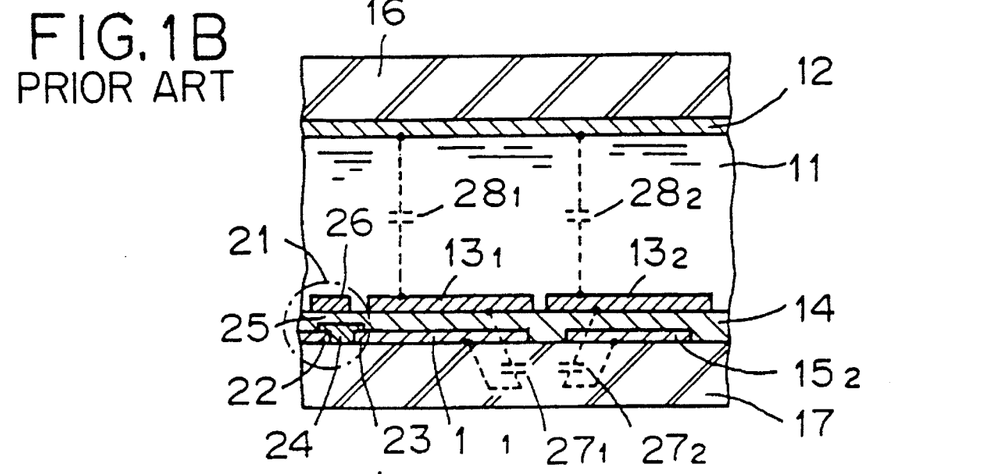
FIG. 1B is a cross-sectional view taken on line 1B—1B of FIG. 1A.

U.S. Pat. No. 4,840,460 discloses a liquid crystal display (LCD) panel typical of the prior art display panel of the type discussed herein. In this patent, as shown in FIGS. 1A and 1B illustrating plan and cross-sectional views, respectively, each of the pixel electrodes 13 facing a common electrode 12 with a liquid crystal layer 11 interposed therebetween is divided into a plurality of (four in the illustration) subpixel electrodes $13_1$–$13_4$ having equal surface areas. Disposed in facing relation with the divided subpixel electrodes $13_1$–$13_4$ are corresponding control capacitor electrodes $15_1$–$15_4$ having different surface areas, the control capacitor electrodes being separated from the subpixel electrodes by an insulation layer or dielectric layer 14. All the control capacitor electrodes $15_1$–$15_4$ in each display pixel are electrically connected with each other. More specifically, the common electrode 12 is disposed on the inner surface of a transparent substrate 16 while the control capacitor electrodes $15_1$–$15_4$ are formed on the inner surface of a second transparent substrate 17 disposed in spaced opposing relation with the first transparent substrate 16. Disposed on those control capacitor electrodes $15_1$–$15_4$ is the insulation layer 14 on which the subpixel electrodes $13_1$–$13_4$ are formed.

The pixel electrodes 13 are arrayed in the form of a matrix on the inner side of the transparent substrate 17. A source bus 18 is provided along each column of the array of pixel electrodes 13 on the inner side of the transparent substrate 17 while a gate bus 19 iS provided along each row of the array of pixel electrodes 13 on the insulation layer 14.

Formed in the vicinity of the intersection between each source bus 18 and the associated gate bus 19 is a thin film transistor 21 which comprises a source electrode 22 and a drain electrode 23 both formed on the inner side of the transparent substrate 17, a semiconductor layer 24 of a material such as amorphous silicon formed between the source and drain electrodes 22, 23, and a gate electrode 26 disposed on the semiconductor layer 24 with a gate insulating film 25 interposed therebetween. The gate insulating film 25 may be formed concurrently with formation of the insulation layer 14. The source electrode 22, the drain electrode 23 and the gate electrode 26 are connected with the source bus 18, the control capacitor electrodes $15_1$, and the gate bus 19, respectively.

The control capacitor electrodes $15_1$–$15_4$ and the the corresponding opposing subpixel electrodes $13_1$–$13_4$ separated therefrom by the insulation layer 14 compose control capacitors $27_1$–$27_4$, respectively. The subpixel electrodes $13_1$–$13_4$ and the opposing common electrode 12 separated therefrom by the liquid crystal layer 11 compose liquid crystal capacitors $28_1$–$28_4$, respectively.

Figure 1C:
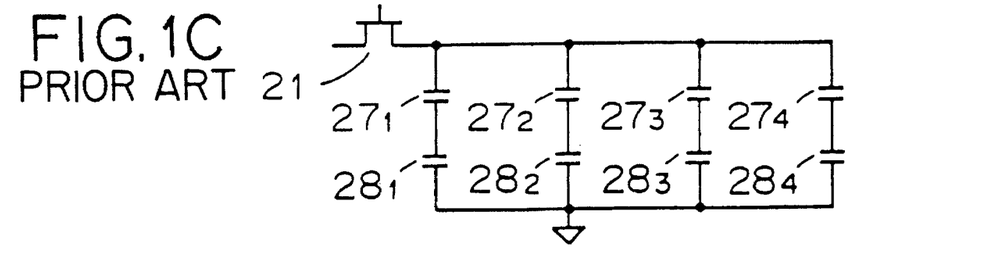
FIG. 1C is an equivalent circuit diagram of the pixel shown in FIG. 1A.

These two types of capacitors are interconnected such that each one of the capacitors of one type is equivalently connected in series with the corresponding one of the capacitors of the other type through an external drive circuit (not shown), as illustrated in FIG. 1C. The driving voltage supplied from the source buses 18 to the control capacitor electrodes $15_1$–$15_4$ through the thin film transistors 21 is thus divided by the two types of capacitors.

While the capacitances of the LC capacitors $28_1$–$28_4$ are equal, the capacitances of the control capacitors $27_1$–$27_4$ are different from each other, so that even if the driving voltage is applied equally to the control capacitor electrodes $15_1$–$15_4$ from the common source, the capacitance-divided voltages applied to the associated LC capacitors $28_1$–$28_4$ may be different from one another. Since the threshold voltage of the liquid crystal 11 is substantially constant over the entire surface of the LCD panel, it is possible to control the numbers of the subpixel electrodes in which the respective capacitance-divided voltages applied to the liquid crystal 11 are higher than the threshold voltage and the sub pixel electrodes in which the respective capacitance-divided voltages applied to the liquid crystal 11 are lower than the threshold voltage, by controlling the applied voltage to the control capacitor electrodes $15_1$–$15_4$, and hence it is possible to drive the divided domains of the display pixel in a stepwise manner.

When an LCD panel is used to display images containing halftones such as those of a television display, the driving voltages supplied to the respective pixel electrodes of the LCD panel may have various magnitudes within a certain range of voltages according to the image signal levels. In an LCD panel in which no pixel electrode is divided into subpixel electrodes, the gray scale display takes place utilizing the inclined region of the transmittance curve of the display pixel region varying from a start-up to a saturation with an increase in the driving voltage. In the inclined region of this transmittance curve the liquid crystal molecules are oriented diagonally with respect to the substrate. Since the transmittance in this state depends greatly on the viewing angle, the appropriate viewing angle for such a LCD panel is usually considerably narrow.

In contrast, in such a pixel as disclosed in the aforesaid U.S. patent where each of the pixel electrodes is divided into a number of subpixel electrodes which are adapted to be supplied with successively varying applied voltages, the subpixel electrode sections will successively reach the saturation region through the inclined region of the transmittance curve as the driving voltage increases such that the transmission of one of the subpixel electrode sections will rise up and reach the saturation region through the inclined region of the transmittance curve, then another one will do the same, and so on.

Consequently, in a state in which any half tone is on display, the LC molecules are oriented diagonally with respect to the substrate in at most one of the subpixel electrode sections, but are oriented either substantially vertically or substantially horizontally in the remaining subpixel electrode sections. By minimizing the areas where the LC molecules are diagonally oriented in the halftone displaying condition as described above, it is possible to decrease the area of the display pixel region in which there is a high viewing angle dependence and hence reduce the average viewing angle dependence of the entire pixel electrode region.

Figure 2A:
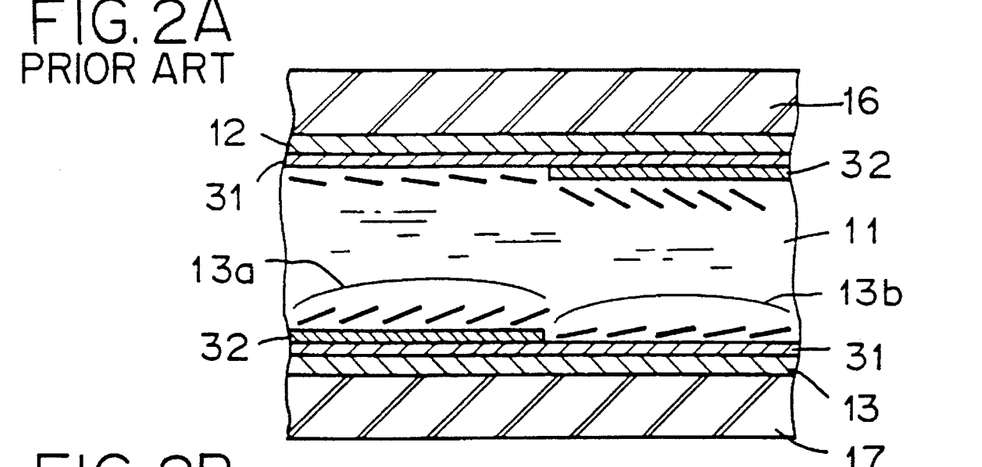
FIG. 2A is a cross-sectional view of a conventional domain-divided TN LCD panel.

Another known approach to widening the viewing angle is illustrated in FIG. 2A. In this approach each pixel electrode 13 is divided into two domains 13a and 13b, for example. The liquid crystal in the domain 13a adjacent the surface on the side of the transparent substrate 17 is made to have a large pretilt angle while the liquid crystal in the domain 13b adjacent the surface on the side of the transparent substrate 17 is made to have a small pretilt angle. On the other hand, the liquid crystal in the domain adjacent the surface on the side of the transparent substrate 16 opposing the domain 13a is made to have a small pretilt angle whereas the liquid crystal in the domain adjacent the surface on the side of the transparent substrate 16 opposing the domain 13b is made to have a large pretilt angle. The small pretilt angle may be provided by diagonal vapor deposition of a non-organic layer 31 such as $SiO_2$ or by formation of polyimide film for a low pretilt angle. The large pretilt angle may be provided by subjecting an organic layer 32 such as polyimide resin for a high pretilt angle to a rubbing treatment. (see SID 92 DIGEST. pp. 798–801: Reference 1.)

Figure 2B:
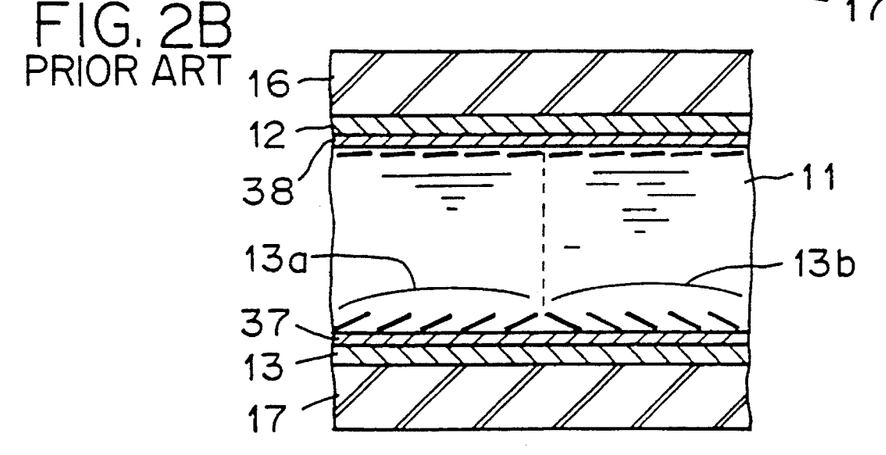
FIG. 2B is a cross-sectional view of a conventional compensated TN LCD panel.
Figure 2C:
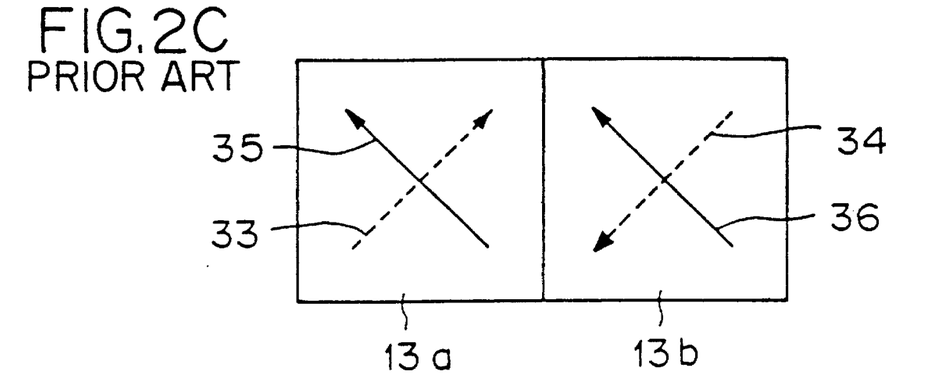
FIG. 2C shows the rubbing directions in the compensated TN LCD panel of FIG. 2B.

Still another method of widening the viewing angle has been proposed as illustrated in FIGS. 2B and 2C. In this method, each pixel electrode 13 is divided into a plurality of, say two domains 13a and 13b having opposite rubbing directions. The domains on the side of the common electrode 12 opposing the domains 13a and 13b, respectively are made to have the same rubbing directions 35, 36 and perpendicular to the rubbing directions 33, 34, respectively of the domains 13a, 13b. The rubbing directions 33, 34 are imparted to the polyimide resin layer 37 for a high pretilt angle while the rubbing directions 35, 36 are imparted to the polyimide resin layer 38 for a low pretilt angle. (see JAPAN DISPLAY '92, pp. 591–594: Reference 2.)

Figure 3:
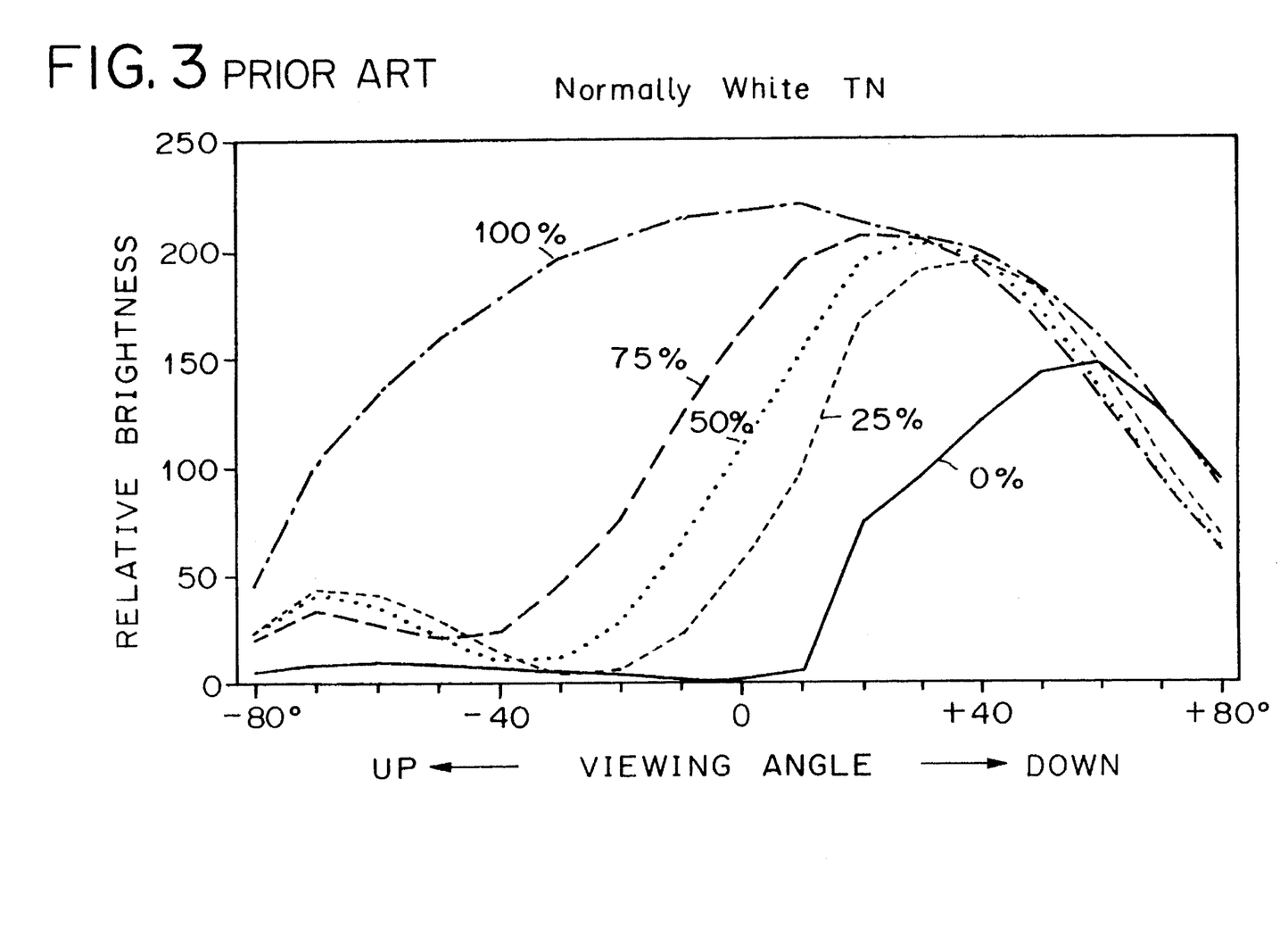
FIG. 3 is a graph showing the up and down viewing angle characteristics of a typical conventional TN LCD panel.

FIG. 3 shows the up and down (negative and positive) viewing angle characteristics of a conventional normally white type TN LCD panel, having no special arrangements for widening the viewing angle, for the various activated states in which the designed normalized brightness of 0, 25, 50, 75 and 100% in the vertical direction are provided by varying the driving voltage applied to the panel with the maximum designed brightness at 100%. In the graph, the abscissa represents the viewing angles to the plain of an upright LCD panel, assuming that the horizontal direction be 0° whereas the ordinate represents the relative values of brightness as measured. As seen in FIG. 3, as the designed normalized brightness lowers, the viewing angle which maximizes the relative brightness increases with respect to the horizontal direction (that is, the angle at which one looks down the LCD panel becomes larger). It is also noted that on the side of the negative (up) viewing angle, peaks ascribed to retardation appear in the respective curves, and then the viewing angles in the respective curves at which the minimal brightness is exhibited become larger in the negative direction with an increase in the designed normalized brightness. Due to such asymmetrical characteristics, gray scale reversal takes places at and beyond about ±30°. It is seen, for instance, that the phenomenon of gray scale reversal in which the order of magnitude of the actually exhibited brightness is reversed occurs at about+40° for the designed normalized brightness of 25, 50, 75 and 100%.

Figure 4:
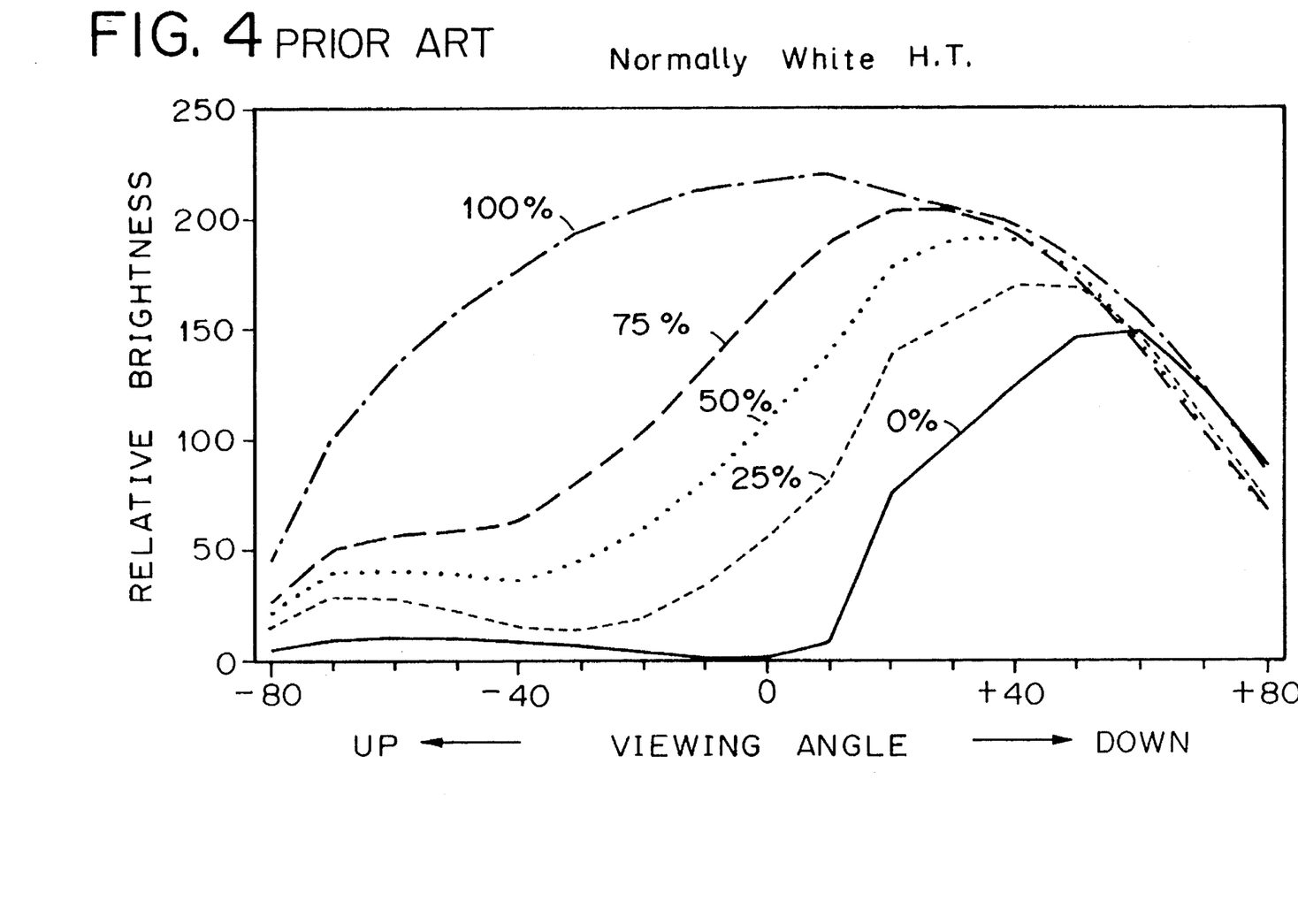
FIG. 4 is a graph showing the up and down viewing angle characteristics of the TN LCD panel illustrated in FIGS. 1A–1C.

With the gray scale LCD panel as shown in FIGS. 1A and 1B, while gray scale reversal in its up and down viewing angle characteristics is less likely to occur as seen from FIG. 4, the problem of the viewing angle characteristics being asymmetrical between the up and down (negative and positive) directions, is not alleviated.

Figure 5:
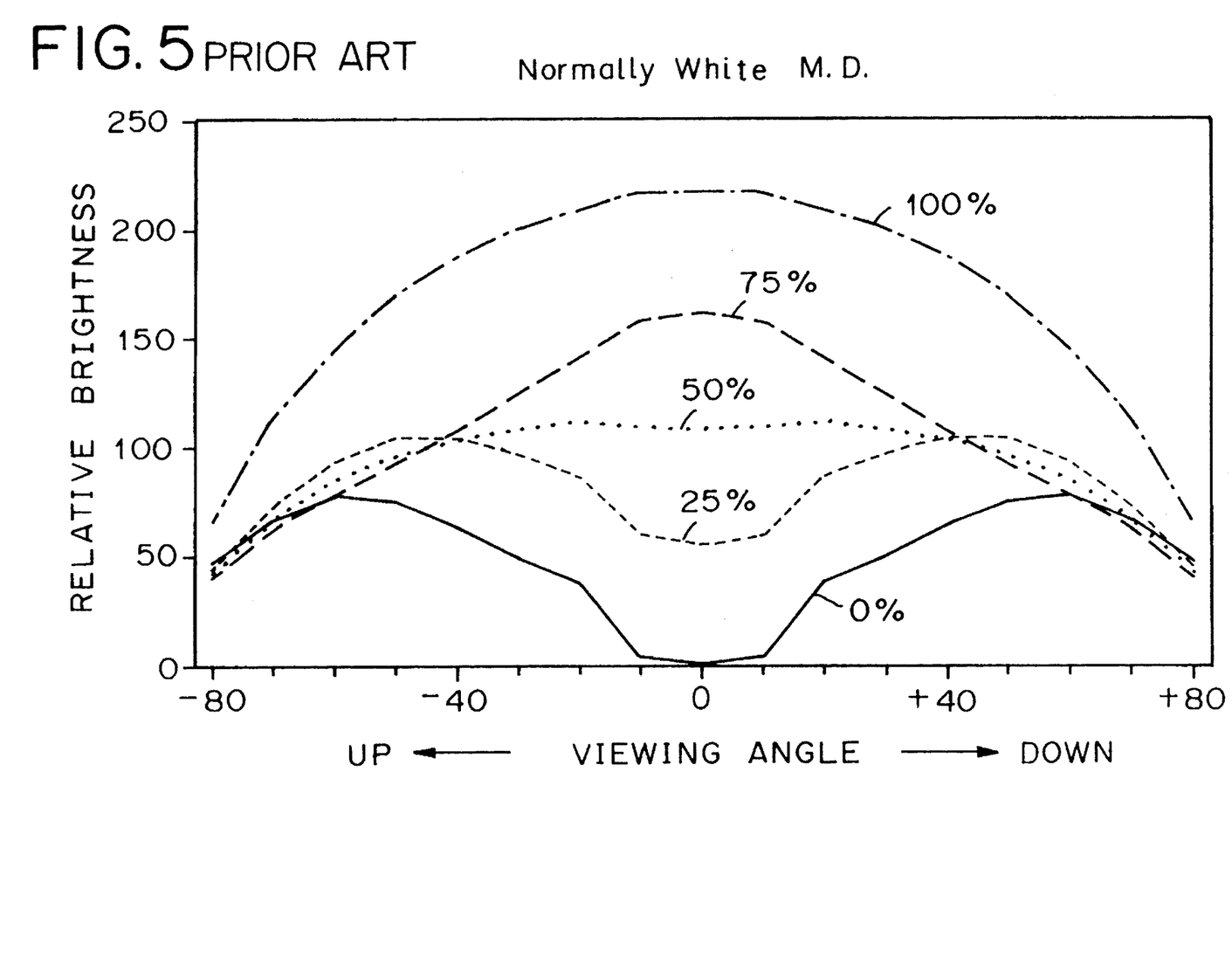
FIG. 5 is a graph showing the up and down viewing angle characteristics of the TN LCD panel illustrated in FIGS. 2A and 2B.

The up and down viewing angle characteristics of the domain-divided TN LCD panel as illustrated in FIG. 2A exhibits symmetry between the up and down directions as seen from FIG. 5. However, gray scale reversal arises at and beyond about ±40°. It is also seen that for the designed normalized brightness of 0%, a relatively high brightness is provided at and beyond about ±40° with the contrast lowered.

The domain-divided, oriented TN LCD panels as illustrated in FIGS. 2B and 2C also exhibit similar characteristics.

SUMMARY OF THE INVENTION

Accordingly, it is an object of this invention to provide an improved gray scale liquid crystal display (LCD) panel in which the up and down viewing angle characteristics are symmetrical between the up and down directions with no gray scale reversal and which has a high contrast.

According to a first aspect of the present invention, in a gray scale liquid crystal display panel having pixel electrodes each being divided into a plurality of subpixel electrodes which are adapted to be supplied with driving voltage at ratios different from each other, the liquid crystals adjacent the surfaces of the opposed transparent substrates are made to have different pretilt angles from each other. More specifically, a first domain having a relatively large pretilt angle and a second domain having a relatively small pretilt angle are provided for each subpixel electrode. Alternatively, a first subpixel electrode section having a relatively large pretilt angle and a second subpixel electrode section having a relatively small pretilt angle are provided for each pixel electrode.

According to a second aspect of this invention, domains having different rubbing directions are provided for each subpixel electrode. Alternatively, each pixel electrode is provided with subpixel electrodes each having a different rubbing direction.

DETAILED DESCRIPTION OF THE PREFERRED EMBODIMENTS

Figure 6A:
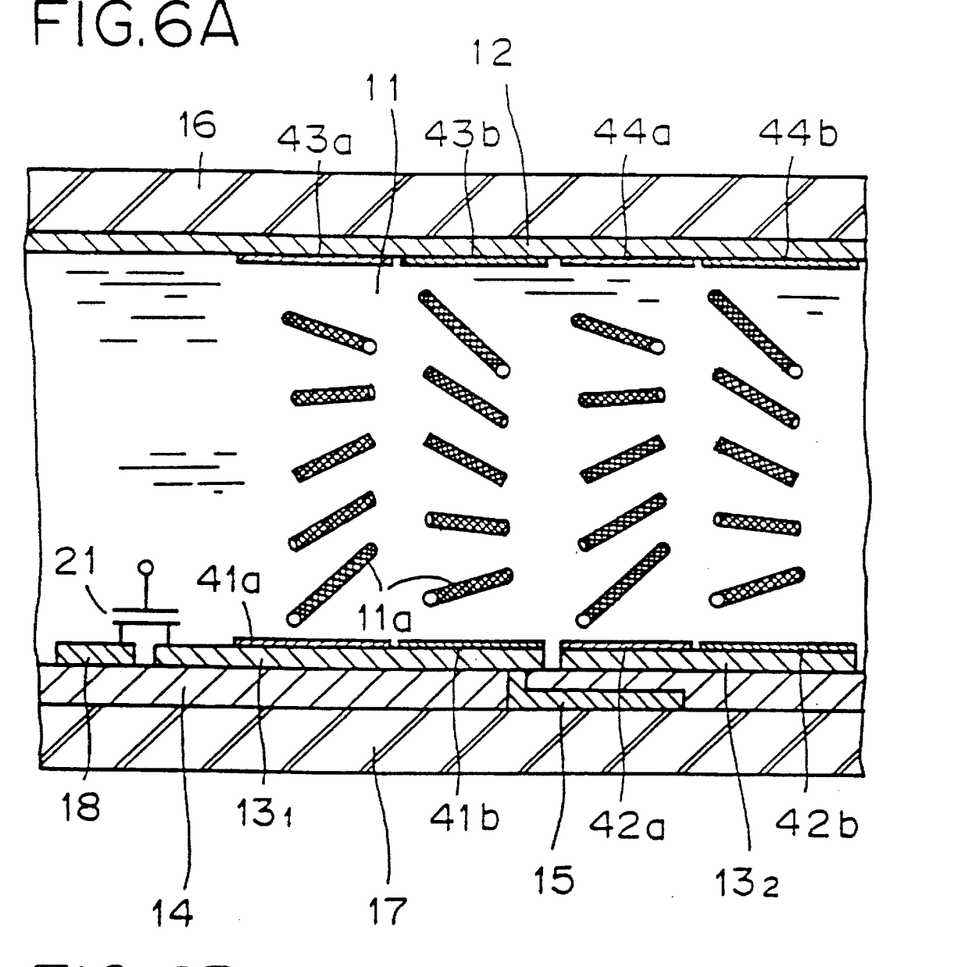
FIG. 6A is a schematic cross-sectional view of a portion of one embodiment according to a first aspect of this invention.

Referring to FIG. 6A, there is shown a portion of one embodiment according to the first aspect of this invention in a cross-sectional view in which corresponding reference numerals are used for those components which correspond to components of the LCD panel of FIG. 1B.

In this embodiment, one pixel electrode 13 is physically divided into two subpixel electrodes $13_1$, and $13_2$. The subpixel electrode $13_1$ is connected directly to a drain of a thin film transistor designated at 21 and also to a control capacitor electrode 15 opposing and separated from the subpixel electrode $13_2$ by an insulation layer or dielectric layer 14. In this embodiment, each of the subpixel electrodes $13_1$ and $13_2$ is divided into two domains on which alignment layers 41a, 41b; 42a, 42b are formed. Alignment layers 43a, 43b; 44a, 44b are formed on a common electrode 12 opposing and separated from the corresponding alignment layers 41a, 41b; 42a, 42b by a liquid crystal layer 11. The alignment layers on these opposed domains impart different pretilt angles between the side of the common electrode 12 and the side of the pixel electrode 13, and the type and/or rubbing directions of the alignment layers are selected such that two domains having different pretilt angles are formed in each of the subpixel electrode regions.

In the embodiment of FIG. 6A the pretilt angles developed by the alignment layers 41a and 42a are shown to be relatively large, those developed by the alignment layers 43a and 44a to be relatively small, those developed by the alignment layers 41b and 42b to be relatively small, and those developed by the alignment layers 43b and 44b to be relatively large, as represented by the orientations of the liquid crystal molecules 11a. When the rubbing directions of the alignment layers 43a, 43b, 44a, 44b on the side of the transparent substrate 16 are as indicated by an arrow 45 shown in FIG. 6B, the rubbing directions of the alignment layers 41a, 41b, 42a, 42b on the side of the transparent substrate 17 are arranged to be perpendicular to the direction of the arrow 45, as indicated by an arrow 46.

The difference between the pretilt angles of the liquid crystals adjacent the surfaces of the alignment layers 41a and 41b should be preferably on the order of 2° or greater. Likewise, the differences between the pretilt angles of the liquid crystals adjacent the surfaces of the opposed alignment layers 41a and 43a and between the pretilt angles of the liquid crystals adjacent the surfaces of the alignment layers 43a and 43b in the same plane should be preferably on the order of 2° or greater. The pretilt angles of the liquid crystals adjacent the surfaces of the alignment layers 41a and 43b are preferably, but not necessarily, equal to each other. Likewise, the pretilt angles of the liquid crystals adjacent the surfaces of the alignment layers 41b and 43a are preferably, but not necessarily, equal to each other.

Such different pretilt angles as described above may be provided simply by using polyimide resin for a high pretilt angle and polyimide resin for a low pretilt angle to form the alignment layers 41a and 41b, respectively, for example and subjecting them to rubbing treatments. Alternatively, the technique as disclosed in the aforesaid reference 1 may be utilized.

Figure 7:
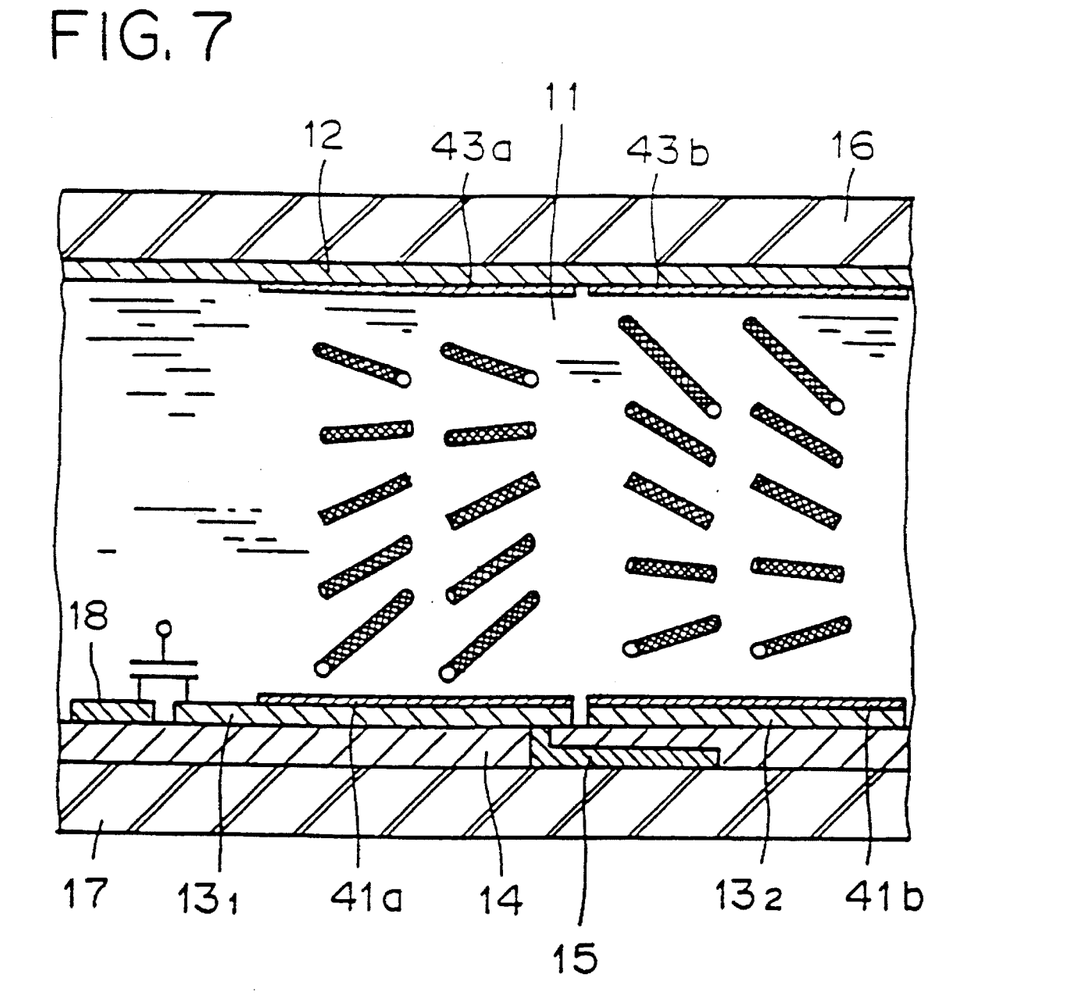
FIG. 7 is a schematic cross-sectional view of a portion of another embodiment according to the first aspect of this invention.

FIG. 7 illustrates another embodiment according to the first aspect of this invention in which like reference numerals are used for those components similar to the components shown in Figs. 1B and 6A.

Figure 6B:
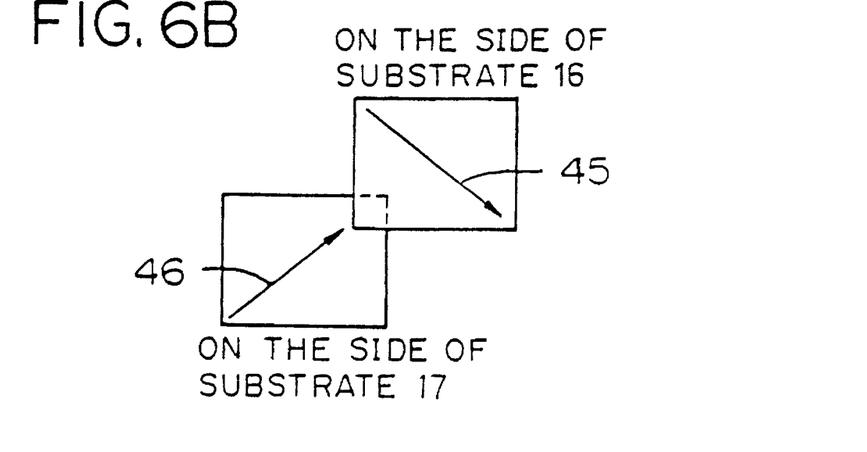
FIG. 6B is a sketch showing the rubbing directions on the sides of the substrates 16 and 17, respectively, in FIG. 6A.

As in the embodiment of FIG. 6A, the liquid crystals in the opposed domains on the sides of the common electrode 12 and of the pixel electrode 13 are made to have different pretilt angles. In this embodiment, however, each pixel electrode has a first subpixel electrode $13_1$ and an adjoining second subpixel electrode $13_2$, the pretilt angles of the liquid crystals adjacent the adjoining subpixel electrodes $13_1$ and $13_2$, respectively being different from each other. More particularly, alignment layers 41a and 41b are formed on the adjoining subpixel electrodes $13_1$ and $13_2$, and in opposing relation therewith alignment layers 43a and 43b are formed on the common electrode 12, the pretilt angles being different between the alignment layers 41a and 41b. The amount of the difference between the pretilt angles and the method of providing different pretilt angles are the same as with the embodiment of FIG. 6A. The rubbing directions of the substrates 16 and 17 are made perpendicular to each other as shown in 6B.

Figures 8A, 8B:
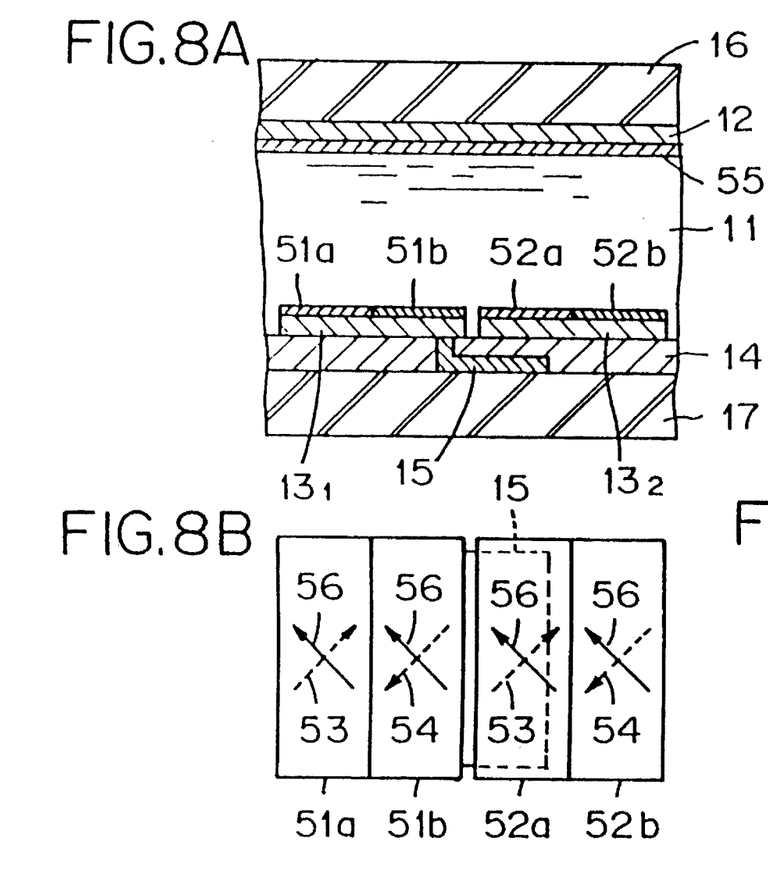
FIG. 8A is a schematic cross-sectional view of a portion of one embodiment according to a second aspect of this invention.
FIG. 8B is a sketch showing the rubbing directions in FIG. 8A.

FIGS. 8A and 8B illustrate an embodiment according to the second aspect of this invention in which like reference numerals are used for those components similar to the components shown in FIG. 6A.

In this embodiment, each pixel electrode 13 is physically divided into two subpixel electrodes $13_1$ and $13_2$ which are capacitively coupled together by means of a control capacitor electrode 15. Each of the subpixel electrodes $13_1$ and $13_2$ is divided into two domains having opposite rubbing directions from each other. Specifically, alignment layers 51a, 51b and 52a, 52b all for a high pretilt angle are formed on the subpixel electrodes $13_1$ and $13_2$, respectively, and as shown in FIG. 8B rubbing treatments on the alignment layers 51a and 52a are in the same direction as indicated by dotted line arrows 53 while rubbing treatments on the alignment layers 51b and 52b are in the same direction as indicated by dotted line arrows 54 but opposite to the dotted line arrows 53.

Those portions of an alignment layer 55 for a low pretilt angle formed on the entire surface of a common electrode 12 opposing the corresponding layers 51a–52b are subjected to rubbing in the same direction as indicated by solid line arrows 56 but perpendicular to the dotted line arrows 53 and 54.

In order to provide each of the subpixel electrodes $13_1$ and $13_2$ with rubbings in opposite directions, polyimide resin coating may be applied to the entire surface of each subpixel electrode. The entire surface of the polyimide resin coating on each subpixel electrode may first be subjected to rubbing in the direction shown by the arrow 53, and then a half of the rubbed surface of the resin coating on each subpixel electrode may be masked with a resist, followed by rubbing the remaining unmasked half of the resin surface, whereupon the mask may be removed. Such technique is described in the aforesaid reference 2.

Figures 9A, 9B:
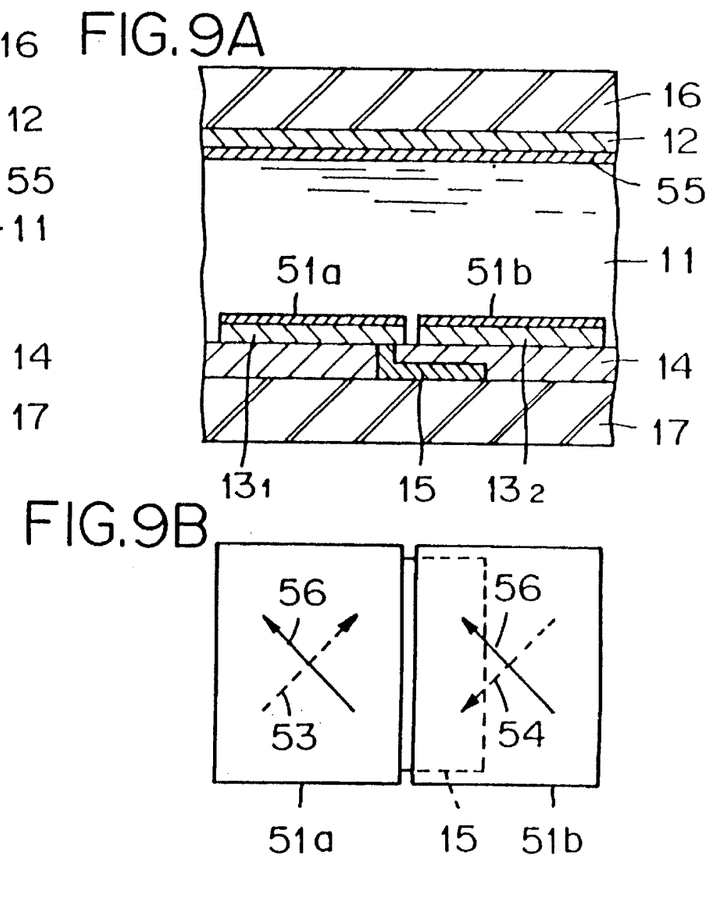
FIG. 9A is a schematic cross-sectional view of a portion of another embodiment according to the second aspect of this invention.
FIG. 9B is a sketch showing the rubbing directions in FIG. 9A.

FIGS. 9A and 9B illustrate another embodiment according to the second aspect of this invention in which like reference numerals are used for those components corresponding to the components shown in FIGS. 8A and 8B.

In this embodiment, the adjacent subpixel electrodes $13_1$ and $13_2$ on each pixel electrode 13 are provided with rubbing treatments in opposite directions from each other. Specifically, alignment layers 51a and 51b for a high pretilt angle are formed on the adjacent subpixel electrodes $13_1$ and $13_2$ of each pixel electrode 13, respectively, and the rubbing direction of the alignment layer 51a is as indicated by a dotted line arrow 53 in FIG. 9B while the rubbing treatment on the alignment layer 51b is in a direction as indicated by a dotted line arrow 54 opposite from the the dotted line arrow 53.

Those portions of an alignment layer 55 for a low pretilt angle formed on the entire surface of a common electrode 12 opposing the corresponding layers 51a and 52b are subjected to rubbing in the same direction as indicated by solid line arrows 56 but perpendicular to the dotted line arrows 53 and 54.

In the embodiments illustrated in FIGS. 8A–8B and 9A–9B, the alignment layers 51a, 51b, 52a and 52b may be of the same material. The common electrode and the subpixel electrodes may be reversed with each other.

Figure 10:
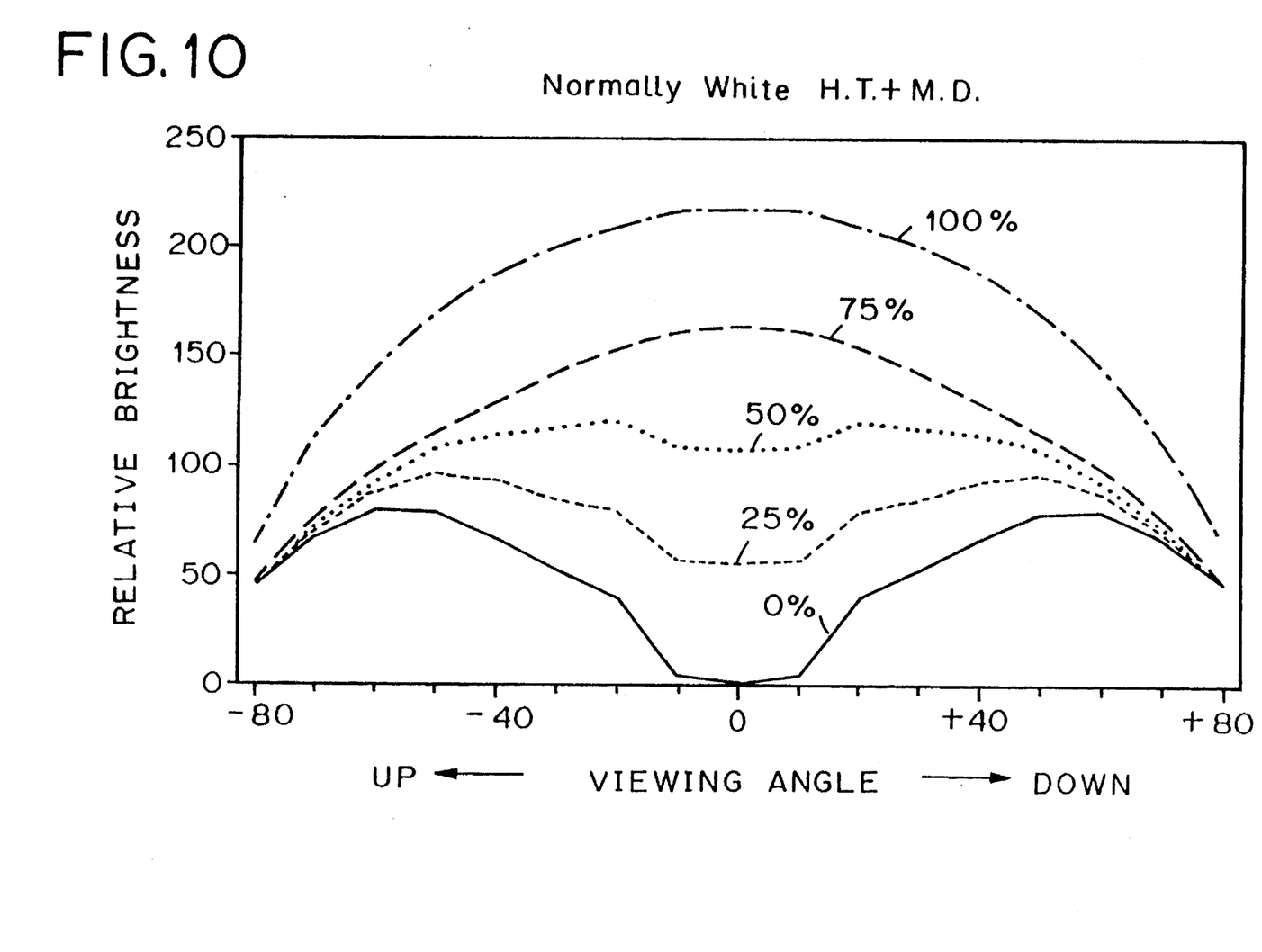
FIG. 10 is a graph showing the up and down viewing angle characteristics of an embodiment of this invention.

The up and down viewing angle characteristics of the embodiment of FIG. 6A are shown in FIG. 10. It is seen that the up and down viewing angle characteristics are symmetrical between the up and down directions. And yet there is no intersection between the characteristics curves defined depending on the respective brightness parameters. In other words, there is no gray scale reversal.

It has been found that the embodiments of FIGS. 7, 8A and 9A exhibit substantially the same up and down viewing angle characteristics as those of the embodiment of FIG. 6A.

It is noted in FIG. 10 that for the designed normalized brightness of 0%, a relatively high brightness is provided at and beyond about ±30° with the improvement of the contrast being not satisfactory.

However, the contrast may easily be improved by the use of an optical compensating means having approximately the same retardation as that of the TN liquid crystal 11.

Figure 11:
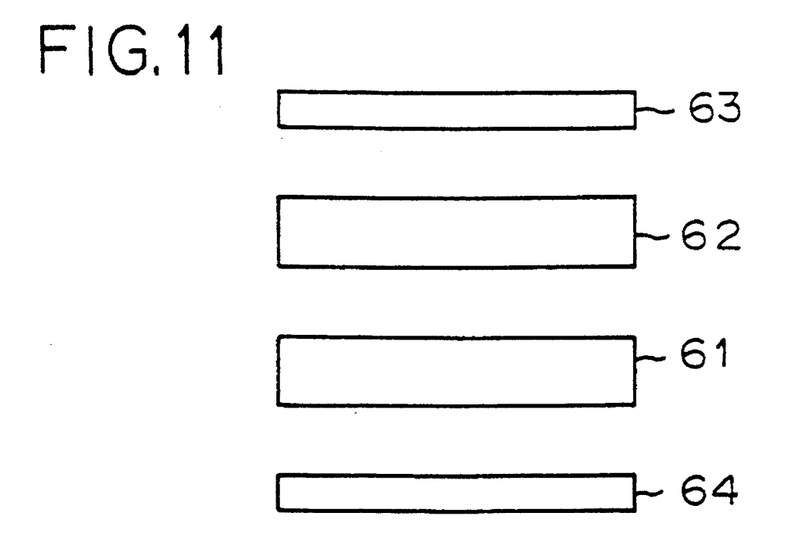
FIG. 11 is an exploded schematic view illustrating a modified embodiment of this invention.

By way of example as illustrated in FIG. 11, an optical compensating plate 62 may be disposed on one side of an LCD panel 61 as shown in any one of FIGS. 6A, 7, 8A and 9A with polarizers 63 and 64 sandwiching the compensating plate 62 and the LCD panel 61 therebetween. The optional compensating plate 62 comprises nematic liquid crystal cells twisted oppositely to the LCD panel 61 and having about the same Δn·d value called retardation (where Δn represents the birefringence of the liquid crystal and d is the thickness of the liquid crystal) as that of the LCD panel 61.

Figure 12:
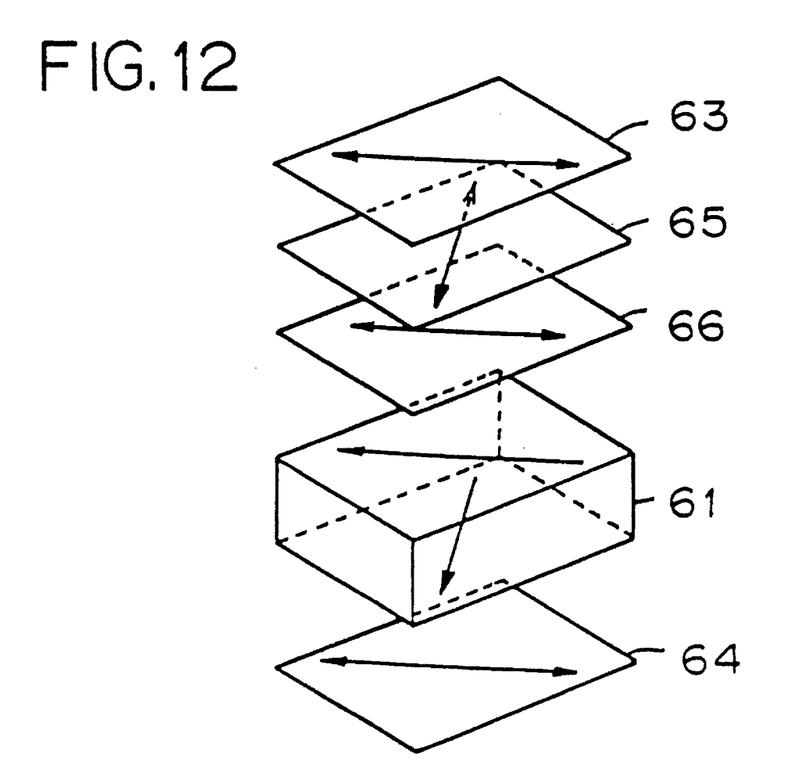
FIG. 12 is an exploded schematic perspective view of another modified embodiment of this invention.

Alternatively, in lieu of the optical compensating plate 62 shown in FIG. 11, a pair of retardation films 65 and 66 may be interposed between the panel 61 and the polarizer 63, as illustrated in FIG. 12. The two retardation films 65 and 66 combined together have a retardation approximately equal to that of the TN liquid crystal 11 and are arranged such that their stretching axes are generally perpendicular to each other and generally in the same direction as the orientation directions of the TN liquid crystals adjacent the substrates 16 and 17 of the panel 61, respectively.

The two retardation films 65 and 66 may be separated and disposed on the opposite sides of the panel 61. It is taught in the Japanese Patent Application Laid Open No. 2-125224 entitled "Electro-optical Elements" that the use of such optical compensating means serves to broaden the viewing angles for the designed normalized brightness of 0%, thereby enhancing the contrast.

It is understood by those skilled in the art that the present invention is not limited to any particular arrangements illustrated herein. For instance, the number of subpixel electrodes divided from a pixel electrode is not limited to two. The method of applying the driving voltage to the various subpixel electrodes at different ratios from each other is not limited to the techniques illustrated herein.

From the foregoing description, it is to be appreciated that the present invention provides an improved gray scale LCD panel having viewing angle characteristics which are made symmetrical between the up and down directions, as well as widened and yet with no gray scale reversal, by dividing each pixel electrode into a plurality of subpixel electrodes to which the driving voltage is applied at different ratios, and providing different pretilt angles either to or within each of the subpixel electrodes and/or using different or opposite rubbing directions. Moreover, the contrast may also be greatly improved by the addition of optical compensating means.

We claim:

1. A gray scale liquid crystal display panel comprising:

first and second transparent substrates disposed in spaced parallel relationship, each having inner and outer surfaces;

a liquid crystal confined between said first and second transparent substrates;

pixel electrodes arranged on the inner surface of said first transparent substrate in the form of a matrix, each pixel electrode being divided into a plurality of subpixel electrodes;

a thin film transistor provided for each of said pixel electrodes for supplying driving voltage to the pixel electrode;

a common electrode disposed on the inner surface of said second transparent substrate in opposing relation to all of said pixel electrodes;

capacitance type voltage divider means for capacitance-dividing the driving voltage supplied to each of said pixel electrodes and for applying to said plurality of subpixel electrodes respective voltages at ratios different from each other;

first alignment layer means formed on surfaces of said subpixel electrodes, said first alignment layer means including a plurality of alignment layers, the surface of each of said subpixel electrodes having at least one of said plurality of alignment layers formed thereon; and second alignment layer means formed on a surface of said common electrode, said second alignment layer means including a plurality of alignment layers each opposed to the alignment layers of said first alignment layer means, respectively, said first and second alignment layer means in combination being operative to so orient said liquid crystal that pretilt angles of the liquid crystal in opposed regions adjacent to the surfaces of the subpixel electrodes and the common electrode are different from each other.

2. The gray scale liquid crystal display panel of claim 1, wherein said first and second alignment layer means include first opposed domains for making the pretilt angles of the liquid crystal adjacent said first alignment layer means larger than the pretilt angles of the liquid crystal adjacent said second alignment layer means, and second opposed domains for making the pretilt angles of the liquid crystal adjacent said first alignment layer means smaller than the pretilt angles of the liquid crystal adjacent said second alignment layer means, within a region defined by each of the subpixel electrodes.

3. The gray scale liquid crystal display panel of claim 1, wherein said first and second alignment layer means include first opposed domains for making the pretilt angles of the liquid crystal adjacent said first alignment layer means larger than the pretilt angles of the liquid crystal adjacent said second alignment layer means within a region defined by one of the subpixel electrodes of the pixel electrode, and second opposed domains for making the pretilt angles of the liquid crystal adjacent said first alignment layer means smaller than the pretilt angles of the liquid crystal adjacent said second alignment layer means within a region defined by another one of the subpixel electrodes of the pixel electrode.

4. The gray scale liquid crystal display panel of claim 1, wherein said first and second alignment layer means include first opposed domains for orientating the liquid crystal adjacent a face of one of said first and second alignment layer means in a first direction within said face and orientating the liquid crystal adjacent a face of the other of said first and second alignment layer means in a second direction intersecting with the first direction within the face of said other alignment layer means, and second opposed domains for orientating the liquid crystal adjacent the face of said one alignment layer means in said first direction within said face and orientating the liquid crystal adjacent the face of the other alignment layer means in a third direction opposite to said second direction within the face of said other alignment layer means.

5. The gray scale liquid crystal display panel of claim 1, wherein said first and second alignment layer means include first opposed domains for orientating the liquid crystal adjacent a face of one of said first and second alignment layer means in a first direction within said face and orientating the liquid crystal adjacent a face of the other of said first and second alignment layer means in a second direction intersecting with the first direction within the face of said other alignment layer means, within a region defined by one of the subpixel electrodes of the pixel electrode, and second opposed domains for orientating the liquid crystal adjacent the face of said one alignment layer means in said first direction within said face and orientating the liquid crystal adjacent the face of the other alignment layer means in a third direction opposite to said second direction within the face of said other alignment layer means, within a region defined by another one of the subpixel electrodes of the pixel electrode.

6. The gray scale liquid crystal display panel of any one of claims 1, 2 and 3, wherein the orientating directions of the liquid crystal adjacent the said first and second transparent substrates imparted by said first and second alignment layer means intersecting each other within opposed regions.

7. The gray scale liquid crystal display panel of claim 6, wherein the orientation of the liquid crystal adjacent said first transparent substrate imparted by said first alignment layer means is in the same direction over substantially the entire face of said first transparent substrate, and the orientation of the liquid crystal adjacent said second transparent substrate imparted by said second alignment layer means is in the same direction over substantially the entire face of said second transparent substrate.

8. The gray scale liquid crystal display panel of claim 6, wherein the angle of intersection between said orientating directions imparted by said first and second alignment layer means is 90 degrees.

9. A gray scale liquid crystal display panel comprising:

first and second transparent substrates disposed in spaced parallel relationship, each having inner and outer surfaces;

a liquid crystal oriented and confined between said first and second transparent substrates;

pixel electrodes arranged on the inner surface of said first transparent substrate in the form of a matrix, each pixel electrode being divided into a plurality of subpixel electrodes;

a thin film transistor provided for each of said pixel electrodes for supplying driving voltage to the pixel electrode;

a common electrode disposed on the inner surface of said second transparent substrate in opposing relation to all of said pixel electrodes;

capacitance type voltage divider means for capacitance-dividing the driving voltage supplied to each of said pixel electrodes and for applying to said plurality of subpixel electrodes respective voltages at ratios different from each other;

first alignment layer means formed on surfaces of said subpixel electrodes, said first alignment layer means including a plurality of alignment layers, the surface of each of said subpixel electrodes having at least one of said plurality of alignment layers formed thereon; and second alignment layer means formed on a surface of said common electrode, said second alignment layer means including a plurality of alignment layers each opposed to the alignment layers of said first alignment layer means, respectively, said first and second alignment layer means including first opposed domains for orientating the liquid crystal adjacent to a face of one of said first and second alignment layer means and the liquid crystal adjacent to a face of the other of said first and second alignment layer means in first and second directions, respectively, intersecting with each other within opposed domains of the surface of one of said subpixel electrodes and the surface of said common electrode, and said first and second alignment layer means including second opposed domains for orientating the liquid crystal adjacent to the face of one of said first and second alignment layer means and the liquid crystal adjacent to the face of the other of said first and second alignment layer means in the same direction as said first direction and in a third direction opposite to said second direction, respectively, within opposed domains of the surface of another one of said subpixel electrodes and the surface of said common electrode.

10. The gray scale liquid crystal display panel of claim 9, wherein said first and second opposed domains are defined by said one of the subpixel electrodes and by said another one of the subpixel electrodes of the pixel electrode, respectively.

11. The gray scale liquid crystal display panel of claim 9, wherein said first and second alignment layer means include third and fourth opposed domains adjoining said first and second opposed domains, respectively, said third and fourth opposed domains being adapted to provide the liquid crystal adjacent said third and fourth opposed domains with orientations in the same directions as said second and first opposed domains do, respectively.

12. The gray scale liquid crystal display panel of any one of claims 9, 10 and 11, wherein said second alignment layer means is adapted to orientate the liquid crystal adjacent the entire face of said common electrode in the same direction.

13. The gray scale liquid crystal display panel of any one of claims 9, 10 and 11, wherein said first and second alignment layer means are adapted to impart pretilt angles different from each other to the liquid crystal adjacent the entire faces of said first and second transparent substrates.

14. The gray scale liquid crystal display panel of claim 1 or 9, including first and second polarizer means sandwiching said first and second alignment layer means therebetween, and an optical compensating means interposed between said first and second polarizer means.

15. The gray scale liquid crystal display panel of claim 14, wherein said liquid crystal is of a TN type and said optical compensating means includes nematic liquid crystal cells having about the same retardation as that of the TN type liquid crystal and twisted oppositely to said TN type liquid crystal.

16. The gray scale liquid crystal display panel of claim 14, wherein said liquid crystal is of a TN type, said optical compensating means is interposed between said first and second polarizer means and includes two retardation films having stretching axes generally perpendicular to each other and generally parallel to the orientation directions of the TN liquid crystal adjacent the first and second transparent substrates, respectively, the total retardation of said two retardation films being approximately equal to that of the TN liquid crystal.

* * * * *